No. 705,672. Patented July 29, 1902.
T. W. HUGHES.
ASH OR GARBAGE RECEPTACLE.
(Application filed May 5, 1902.)
(No Model.)
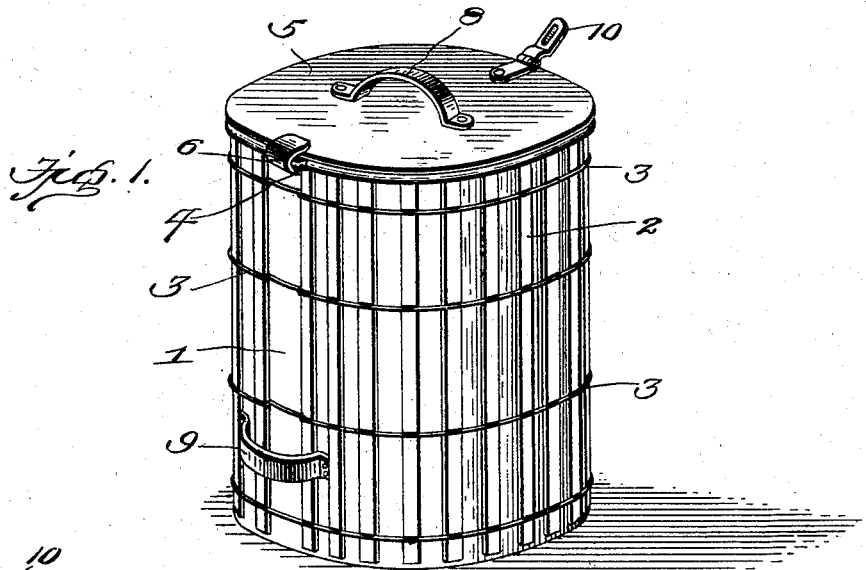
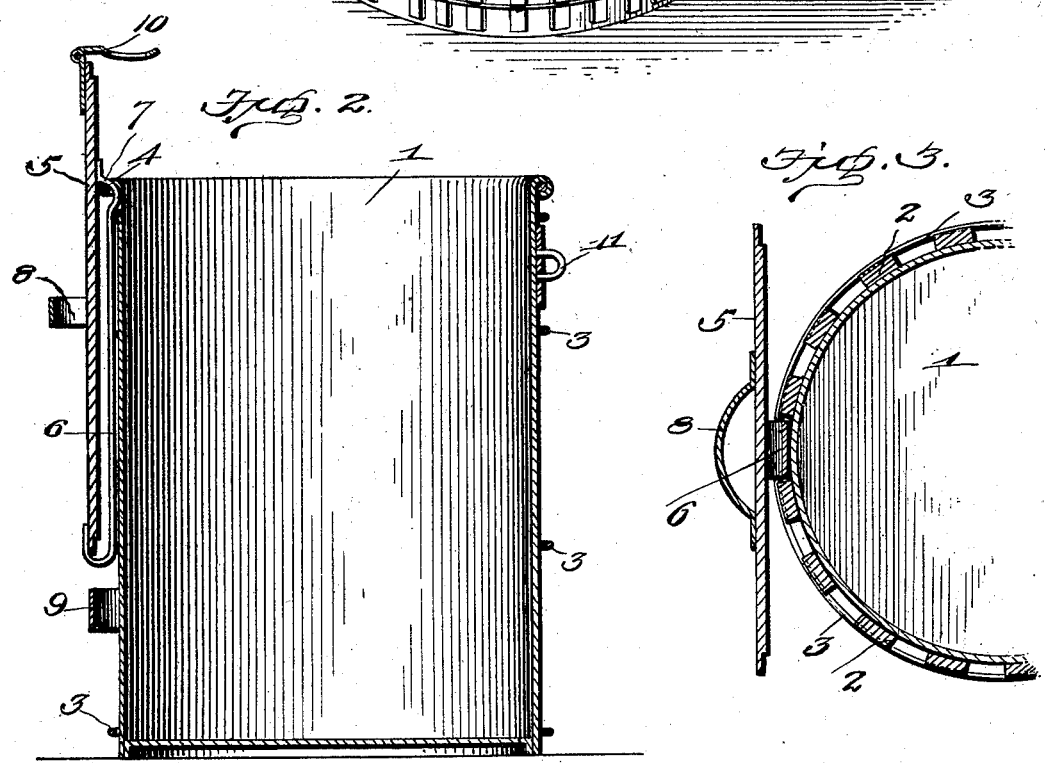
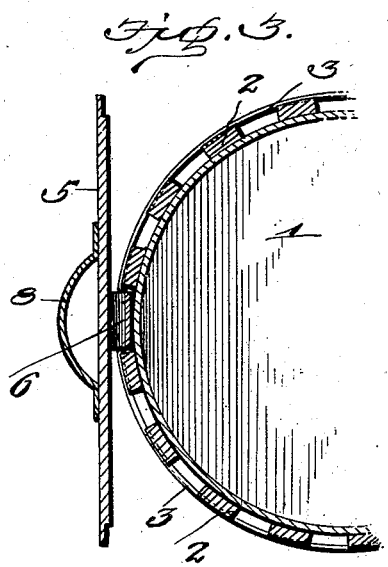
Witnesses
C. C. Hunt
C. J. Willson
Inventor
Thomas W. Hughes
By H. B. Willson & Co.
Attorneys

UNITED STATES PATENT OFFICE.

THOMAS W. HUGHES, OF TRENTON, NEW JERSEY, ASSIGNOR OF TWO-THIRDS TO L. N. CLAYTON AND A. BUGBEE, OF TRENTON, NEW JERSEY.

ASH OR GARBAGE RECEPTACLE.

SPECIFICATION forming part of Letters Patent No. 705,672, dated July 29, 1902.

Application filed May 5, 1902. Serial No. 105,998. (No model.)

*To all whom it may concern:*

Be it known that I, THOMAS W. HUGHES, a citizen of the United States, residing at Trenton, in the county of Mercer and State of New Jersey, have invented certain new and useful Improvements in Ash or Garbage Receptacles; and I do declare the following to be a full, clear, and exact description of the invention, such as will enable others skilled in the art to which it appertains to make and use the same.

The invention relates to ash and garbage receptacles.

The object of the invention is to provide a receptacle of this character which shall be simple of construction, durable in use, comparatively inexpensive of production, and one which may be easily handled for discharging it of its contents and which will fill all sanitary requirements of the different municipalities.

With the above and other objects in view, which will readily appear as the nature of the invention is better understood, said invention consists in certain novel features of construction and combination and arrangement of parts, which will be hereinafter fully described, defined in the appended claims, and illustrated in the accompanying drawings, in which—

Figure 1 is a perspective view of the improved ash or garbage receptacle, showing it closed. Fig. 2 is a longitudinal sectional view showing it open, in which position it may be conveniently grasped and inverted to discharge its contents. Fig. 3 is a fragmentary cross-sectional view through the rear side of the receptacle and the cover with the parts in the position shown in Fig. 2.

In the drawings, 1 denotes the receptacle, which may be of any well-known or approved shape (shown in the present instance circular in cross-section) and which may be of any suitable material, (shown in the present instance as metal.) When made of metal, in order to prevent injury to the receptacle I provide a guard, which consists of a series of vertical slats 2 being arranged around the sides of the receptacle and provided with grooves to receive locking-wires 3. These slats are preferably spaced apart and, as stated, prevent injury to the receptacle.

4 denotes a hinge-pin located at the upper end of the receptacle and preferably formed of the wire around which the upper end of the receptacle is beaded and which projects laterally beyond the vertical surface of the receptacle, as shown in Fig. 2. Any other form of hinge-pin may be provided.

5 denotes the cover, which has a bail 6 secured to its under side and which engages the hinge-pin. One end of the bail (the upper end) when the top of the receptacle is in the position shown in Fig. 2 is provided with an abrupt bulge or offset 7, which is adapted to engage the hinge-pin and when the cover is in the position shown in Fig. 2 to permit of the vessel being raised when the handle 8 of the top is grasped and elevated without changing the relative positions of the cover and vessel.

9 denotes a handle secured to the lower end of the receptacle.

10 denotes the hinge-hasp secured to the cover and adapted to engage a staple 11. The hasp and staple may or may not be used.

Assuming the receptacle to be filled and closed and it is desired to discharge its contents, the handle 9 is grasped, the cover swung slightly upwardly and then rearwardly and then allowed to swing down into the position shown in Fig. 1, in which position it will be observed that the hinge-pin is seated in the bulge or offset of the bail, and the lower end of the bail is located between two of the protecting-slats. The handle of the cover is now grasped with the left hand by inserting the fingers downwardly through the handle, and the handle of the receptacle is grasped with the right hand by inserting the fingers upwardly through the handle, and in this position a secure hold is obtained upon the vessel to permit of it being conveniently emptied, which may be done by turning the vessel to the left or inverting it in a forward direction. In turning it to the left, which is the most convenient way, it will be observed that by reason of the lower end of the bail engaging the receptacle between the slats these slats will act as stops to prevent the lateral movement of the cover with respect to the receptacle, while the offset or bulge in the bail will prevent the cover slipping upwardly when its handle is grasped with the left hand.

From the foregoing description, taken in connection with the accompanying drawings, it is thought that the construction, mode of operation, and advantages of the improved ash or garbage receptacle will be readily apparent without requiring a more extended explanation.

Various changes in the form, proportion, and the minor details of construction may be resorted to without departing from the principle or sacrificing any of the advantages of this invention.

Having thus described the invention, what is claimed as new, and desired to be secured by Letters Patent, is—

1. The combination with a receptacle provided with a hinge-pin; of a cover for said receptacle having a bail on its lower side to engage said hinge-pin and permit of a sliding movement of said cover across the top of the receptacle and a swinging movement of the cover to a position parallel with the sides of the receptacle, and guard-slats secured to the receptacle and spaced apart, two of said slats adapted to receive between them when the cover is in a vertical position the lower end of the bail and act as a stop against lateral movement of the cover with respect to the receptacle, substantially as specified.

2. The combination with a receptacle provided with a hinge-pin; of a cover for said receptacle having a bail on its lower side to engage said hinge-pin and permit of a sliding movement of said cover across the top of the receptacle and a swinging movement of the cover to a position parallel with the sides of the receptacle, a handle secured to the top, and a handle secured to the lower end of the receptacle beneath the handle of the top when said top is in a vertical position, substantially as and for the purpose set forth.

In testimony whereof I have hereunto set my hand in presence of two subscribing witnesses.

THOMAS W. HUGHES.

Witnesses:
CHAS. H. FORMAN,
CHAS. L. PATTERSON.